US012403708B2

(12) United States Patent
Billow et al.

(10) Patent No.: US 12,403,708 B2
(45) Date of Patent: *Sep. 2, 2025

(54) SYSTEMS AND METHODS FOR DETERMINING PRINTING CONDITIONS BASED ON SAMPLES OF IMAGES PRINTED BY SHUTTLE-BASED PRINTERS

(71) Applicant: Electronics for Imaging, Inc., Londonderry, NH (US)

(72) Inventors: Steven A. Billow, Bow, NH (US); Ghilad Dziesietnik, Palo Alto, CA (US)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/774,467

(22) Filed: Jul. 16, 2024

(65) Prior Publication Data

US 2024/0367448 A1 Nov. 7, 2024

Related U.S. Application Data

(63) Continuation of application No. 18/306,091, filed on Apr. 24, 2023, now Pat. No. 12,064,980, which is a continuation of application No. 16/421,287, filed on May 23, 2019, now Pat. No. 11,660,892, which is a continuation of application No. 15/291,016, filed on Oct. 11, 2016, now Pat. No. 10,300,723.

(51) Int. Cl.
*B41J 29/393* (2006.01)

(52) U.S. Cl.
CPC ...... *B41J 29/393* (2013.01); *B41J 2029/3935* (2013.01)

(58) Field of Classification Search
CPC . B41J 29/393; B41J 2/045; B41J 29/38; B41J 2029/3935
See application file for complete search history.

(56) References Cited

U.S. PATENT DOCUMENTS

| | | | |
|---|---|---|---|
| 5,796,928 | A | 8/1998 | Toyomura et al. |
| 6,530,639 | B1 | 3/2003 | Matsuda |
| 8,777,350 | B2 | 7/2014 | Miura |
| 8,867,796 | B2 | 10/2014 | Vans et al. |

(Continued)

FOREIGN PATENT DOCUMENTS

| | | |
|---|---|---|
| CN | 103443714 A | 12/2013 |
| CN | 104040520 A | 9/2014 |

*Primary Examiner* — Thinh H Nguyen
(74) *Attorney, Agent, or Firm* — Perkins Coie LLP

(57) ABSTRACT

Embodiments include a method performed by a system operative to determine a condition related to a printed section printed by a shuttle-based printer. The method includes printing a portion of an image on a section of a medium, thereby providing a printed section. The section of the medium can have a size defined by at least a step size taken by the shuttle-based printer to advance the medium in a downstream direction. The method also includes scanning at least the printed section to capture a sample image of the printed section. The sample image can be captured by using an imager moving in a direction perpendicular to the downstream direction. The method also includes inspecting at least the sample image to determine a value indicative of a condition related to the printed section.

20 Claims, 9 Drawing Sheets

(56) References Cited

U.S. PATENT DOCUMENTS

| | | | | |
|---|---|---|---|---|
| 9,088,673 | B2 * | 7/2015 | Banner | G06T 7/33 |
| 9,881,237 | B2 | 1/2018 | Chong et al. | |
| 11,660,892 | B2 * | 5/2023 | Billow | B41J 29/393 347/39 |
| 2003/0164955 | A1 | 9/2003 | Vinas et al. | |
| 2007/0153035 | A1 | 7/2007 | Jung et al. | |
| 2008/0088660 | A1 | 4/2008 | Lowe et al. | |
| 2012/0070040 | A1 | 3/2012 | Vans et al. | |
| 2013/0033640 | A1 | 2/2013 | Lee | |
| 2013/0321513 | A1 | 12/2013 | Chen et al. | |
| 2014/0126000 | A1 | 5/2014 | Chong et al. | |
| 2015/0210098 | A1 | 7/2015 | Tamiya et al. | |
| 2017/0153035 | A1 | 6/2017 | Sartain et al. | |

* cited by examiner

SYSTEMS AND METHODS FOR DETERMINING PRINTING CONDITIONS BASED ON SAMPLES OF IMAGES PRINTED BY SHUTTLE-BASED PRINTERS

CROSS-REFERENCE TO RELATED APPLICATION

This application is a continuation of U.S. patent application Ser. No. 18/306,091 filed Apr. 24, 2023, which is a continuation of U.S. patent application Ser. No. 16/421,287, filed on May 23, 2019, which is a continuation of U.S. patent application Ser. No. 15/291,016, filed on Oct. 11, 2016, now U.S. Pat. No. 10,300,723, which are incorporated herein in their entirety by this reference thereto.

TECHNICAL FIELD

The teachings disclosed herein relate generally to systems and methods for determining printing conditions based on samples of printed images and, more particularly, for determining printing conditions based on samples of images printed by shuttle-based printers.

BACKGROUND

Common types of printers include single-pass systems and shuttle-based systems. FIG. 1A illustrates an example of a single-pass system implemented on a printer. One or more printheads span the width of the printer. A "width" of a printer refers to the range of a printing area in a direction perpendicular to the direction of the paper transport (i.e., downstream direction). The printheads can access reservoirs of cyan-, magenta-, yellow-, and black-colored ink. An image is printed on a medium by advancing the medium downstream under the arrangement of printheads that eject ink onto the medium. An "image" refers to any visually perceptible object (e.g., a document, a banner, a graphic) that can be recorded on a "medium," which is a physical substrate (e.g., paper or tile) upon which the image can be permanently or temporarily recorded. Moreover, an "image" may refer to a portion of another image. The printheads can dispense different colored inks at the same time to print a colored image.

FIG. 1B illustrates an example of a shuttle-based system (i.e., a multi-pass system) implemented on a printer. Here, printing involves multiple "passes" of a printer carriage that moves perpendicular to the downstream direction. The carriage includes printheads. With each pass, ink can be dispensed onto the medium to print an image. As such, the carriage may need to pass the printheads over the medium multiple times to produce full-color results.

Systems for inspecting images being printed have long been a tool employed to ensure acceptable print quality. Common inspection systems use line sensors or area sensors that capture a sample image of a printed image. This captured image can be analyzed to check print quality. For example, FIG. 2A illustrates an example of a line sensor that spans the entire width of a printer. FIG. 2B illustrates an example of a line sensor that does not span the entire width of the printer but includes optics that can capture the entire width of the printer. Lastly, FIG. 2C illustrates an example of an area sensor that captures an area of an image being printed. High-speed printing presses and single-pass inkjet systems commonly use a stationary two-dimensional still camera to capture images of a printed image. However, wide-format printers require such a large camera that it is impractical and cost-prohibitive to implement such systems.

SUMMARY

Introduced here are at least one method, at least one system, and at least one apparatus. The at least one method can be performed by a system for inspecting images printed by a shuttle-based printer. The method includes printing a portion of an image on a section of a medium, thereby providing a printed section. The section of the medium can have a size defined by at least a step size taken by the shuttle-based printer to advance the medium in a downstream direction. The method also includes scanning the printed section to capture a sample image of the printed section. The sample image can be captured by using an imager moving in a direction perpendicular to the downstream direction. The method also includes inspecting at least a portion of the sample image to determine a value indicative of a condition related to the printed section (e.g., a condition of the shuttle-based printer or the final printed image).

In some embodiments, a system for inspecting an image printed by a shuttle-based printer includes a printer carriage that can print a portion of an image on a section of a medium, thereby providing a printed section. The section of the medium can have a size defined by at least a step size taken by the shuttle-based printer to advance the medium in a downstream direction. The system also includes an imager that can capture a sample image of the printed section. The sample image is captured as the imager moves in a direction perpendicular to the downstream direction. The system also includes an inspection subsystem that can inspect at least a portion of the sample image to determine a value indicative of a condition related to the printed section.

In some embodiments, a shuttle-based printer includes a printer carriage configured to print a portion of an image on a section of a medium. The section of the medium can have a size defined by at least a step size taken by the shuttle-based printer to advance the medium in a downstream direction. The shuttle-based printer includes an imager configured to capture a sample image of the printed section. The sample image can be captured as the imager moves simultaneously with the printer carriage in a direction perpendicular to the downstream direction.

The aforementioned embodiments may involve inspection of any combination of at least a portion of a captured sample image, multiple sample images of printed sections, or a composite of all the sample images that form a final printed image. Further, any of at least the portion of the sample image or the multiple sample images can be inspected (e.g., analyzed) independently, depending on, for example, regions or sample images that a customer or system preselects (e.g., declares as important).

Other aspects of the disclosed embodiments will be apparent from the accompanying figures and detailed description.

This Summary is provided to introduce a selection of concepts in a simplified form that are further explained below in the Detailed Description. This Summary is not intended to identify key features or essential features of the claimed subject matter, nor is it intended to be used to limit the scope of the claimed subject matter.

DETAILED DESCRIPTION

Figure 1A:
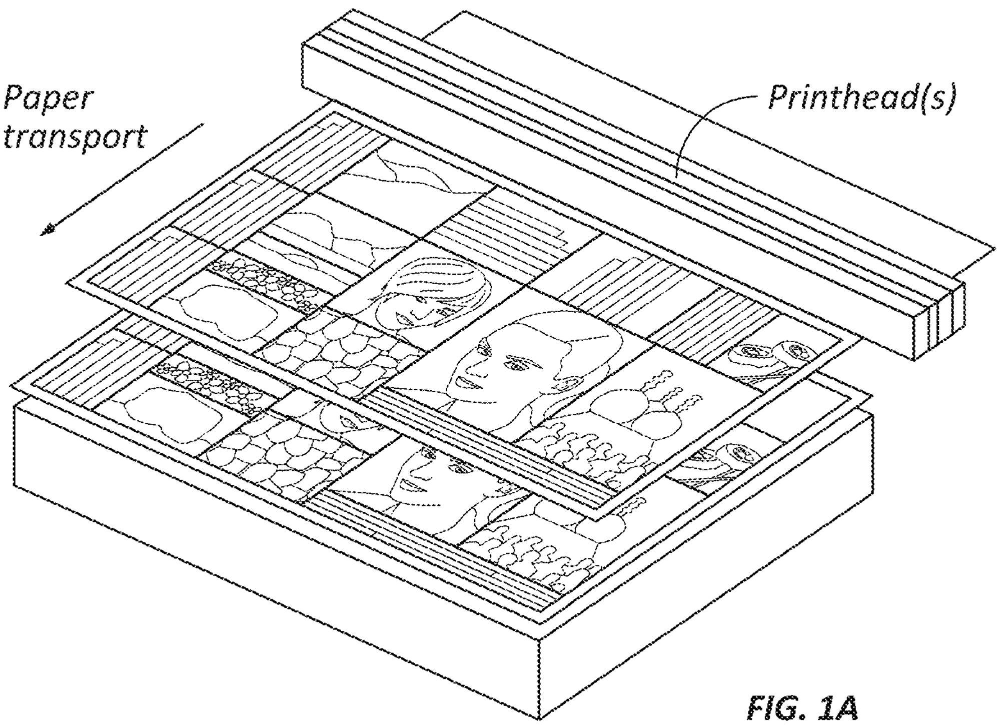
FIG. 1A illustrates an example of a single-pass system implemented on a printer.
Figure 1B:
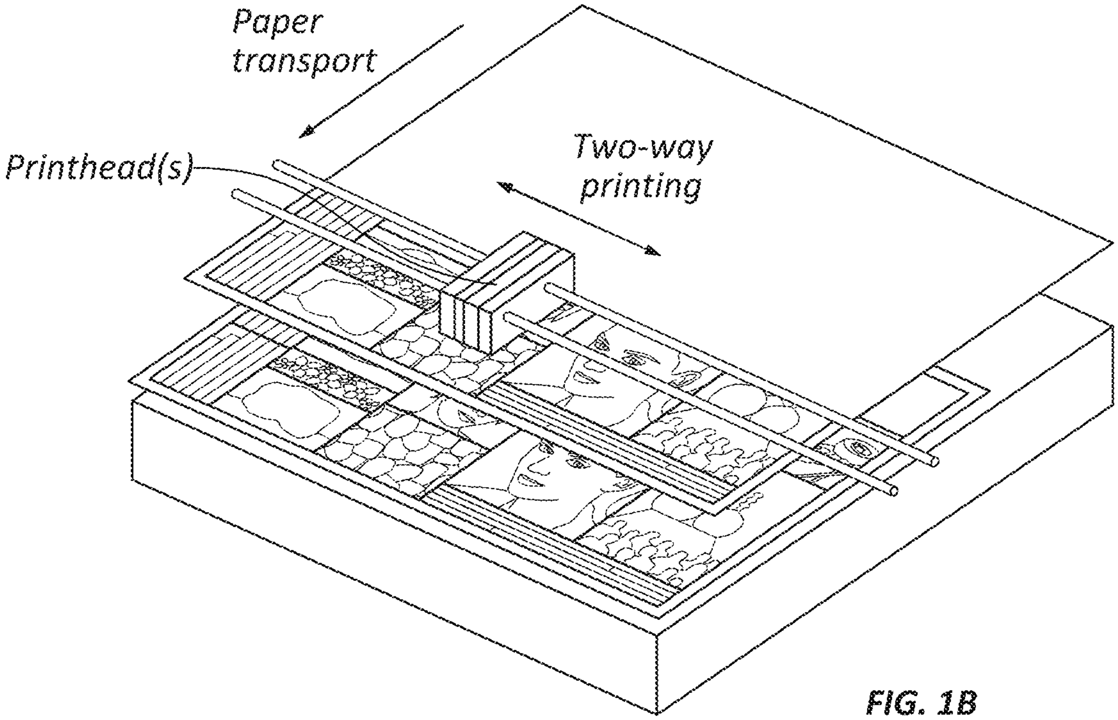
FIG. 1B illustrates an example of a shuttle-based system implemented on a printer.
Figure 2A:
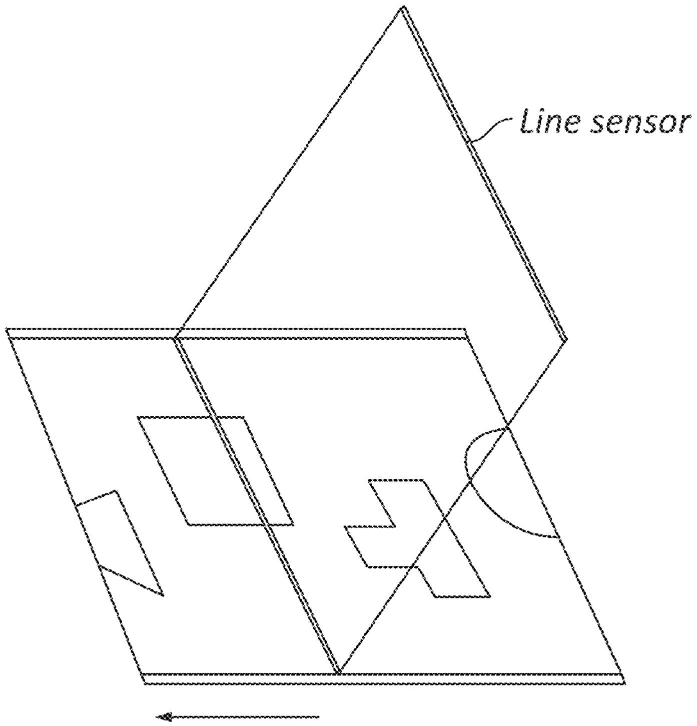
FIG. 2A illustrates an example of a line sensor that spans an entire width of a printer.
Figure 2B:
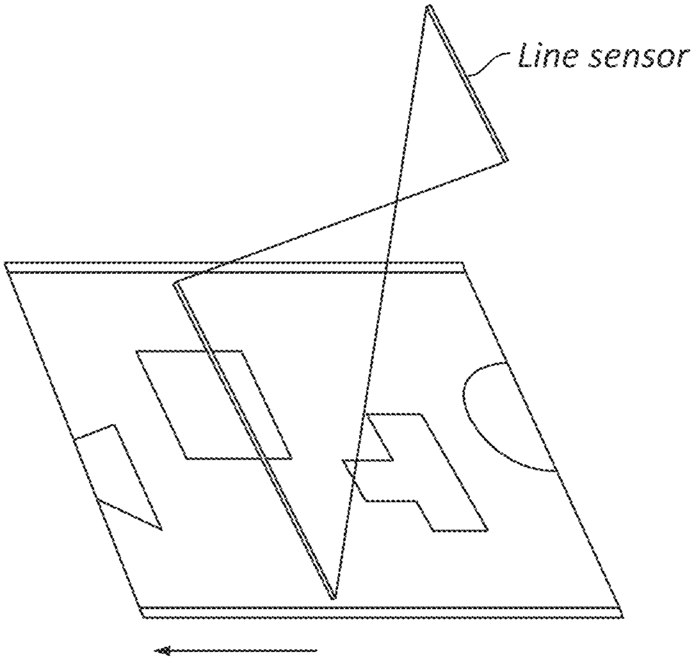
FIG. 2B illustrates an example of a line sensor including optics that span the entire width of a printer.
Figure 2C:
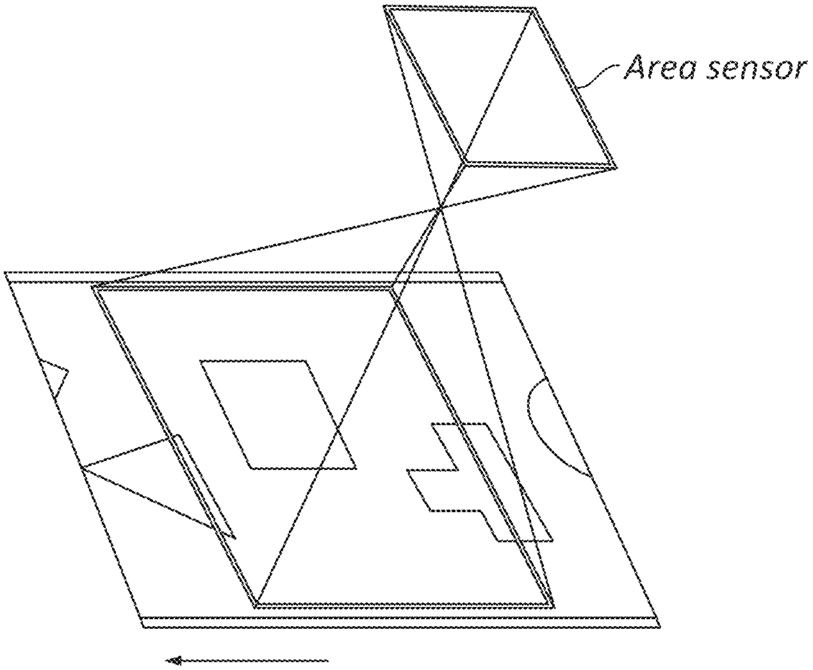
FIG. 2C illustrates an example of an area sensor that captures an area of an image being printed.

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating" or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, the terms "connected," "coupled," or variants thereof, mean any connection or coupling, either direct or indirect, between two or more elements. The coupling or connection between the elements can be physical, logical, or a combination thereof.

The disclosed embodiments include methods, systems, and apparatuses that implement shuttle-based technologies to inspect images being printed. For example, a shuttle-based printer can print a section of an image on a medium. The section can correspond to at least a step size taken by the printer to advance the medium in a downstream direction. An imager (e.g., scanner) can capture samples (i.e., sub-images) of printed sections as the imager moves back and forth over the printed sections, in a direction perpendicular to the downstream direction. Computer software can be used to generate an image representative of any portion of a printed image by stitching together any number of the captured samples. Any number or combination of separate or stitched captured samples can be inspected to determine a printing condition (e.g., of the shuttle-based printer).

The imager of the disclosed embodiments has a smaller width compared to a line-scan camera that would span the entire width of a printer. As such, an array of sampled images can be captured across the width of the printer and a final inspection can be performed on an image that has been reconstructed from various samples acquired on each pass by the smaller imager. Specifically, computer software is used to reconstruct a final image from a multitude of samples captured on different passes. Use of this smaller imager to scan portions of a printed image on different passes enables scalability for wide-format printers while avoiding the need for costly wide-format cameras.

As such, the disclosed technology provides a cost-effective way to perform high-quality and high-resolution inspection for wide-format, high-speed printing presses to ensure acceptable print quality. Moreover, the disclosed imager can be coupled or decoupled from the printer carriage (which moves printheads back and forth). Thus, the imager can move simultaneously or independently of the carriage. Structurally coupling the imager to the carriage can further reduce costs by using existing structures to capture the array of images. In contrast, structurally decoupling the imager from the carriage can provide increased flexibility for different applications.

Embodiments of the disclosed system can check various values of parameters indicative of various printing conditions related to a printed image, and can perform various actions based on whether the printed image satisfies those printing conditions. A condition may include a print quality, which can be affected by the status of consumables (e.g., low ink), mechanical imperfections (e.g., misalignment of printheads, nozzle misbehavior, poor calibration uniformity), imperfections of mediums (e.g., substrate defects), imperfections with color, gloss, or the like. The parameters can include a threshold value or range of values used to determine whether a condition is satisfied and reject printed products that do not satisfy that condition. For example, a parameter can be an edge sharpness that must exceed a preselected value or be within a preset range of values to satisfy a print quality condition.

In another example, the disclosed system may compare a newly printed image to a "master" printed image, which may be a previously printed image that was deemed to be "good" by a customer/operator, to determine whether the newly printed image satisfies a print quality condition. In another example, a newly printed image can be compared to the digital file from which the newly printed image originated, to determine whether the newly printed image satisfies a print quality condition. In yet another example, a printer can print bar codes on or near primary printed images and compare the print quality of the bar codes to established standards or grades to infer the print quality of the primary printed images. Moreover, the disclosed system can be set to inspect variable data such as serial numbers that vary from copy to copy of a printed job, and compare those serial numbers to expected values.

The disclosed technology could also be used for diagnostic assessment by the scanning and imaging of various printed targets. As such, nozzle-out or misdirected nozzles could be detected, alignment errors could be measured from an appropriately designed target, and color adjustments could be facilitated. In some embodiments, the disclosed system may inspect a secondary printed image as a "printed target" added to a primary printed image. The secondary printed image may be used to infer a condition of the primary printed image. For example, a printer can print nozzle test patterns (secondary printed images) on or near primary printed images and compare the print quality of the nozzle test patterns to established standards or grades to infer the print quality of the primary printed images. Thus, the disclosed system may inspect the primary printed image, or inspect a secondary printed image added to the primary printed image to infer a condition of the primary printed image.

As indicated above, the disclosed technology can perform different actions based on the results of the inspection. For example, a defective printed image could be rejected based on established thresholds regarding an acceptable print quality. Other actions that could be taken include triggering cleaning of the printheads, adjusting elements of alignment or registration, halting printing operations, prompting maintenance operations, combinations thereof, or the like.

In some embodiments, the disclosed technology can determine various values of parameters indicative of various printing conditions of a medium upon which an image can be printed. For example, the disclosed system can determine whether there are any defects on incoming mediums upon which the printer is scheduled to print images. In the event that a defective medium is detected, the printer can reject the defective medium and bypass printing on the defective medium to conserve resources.

Figure 3:
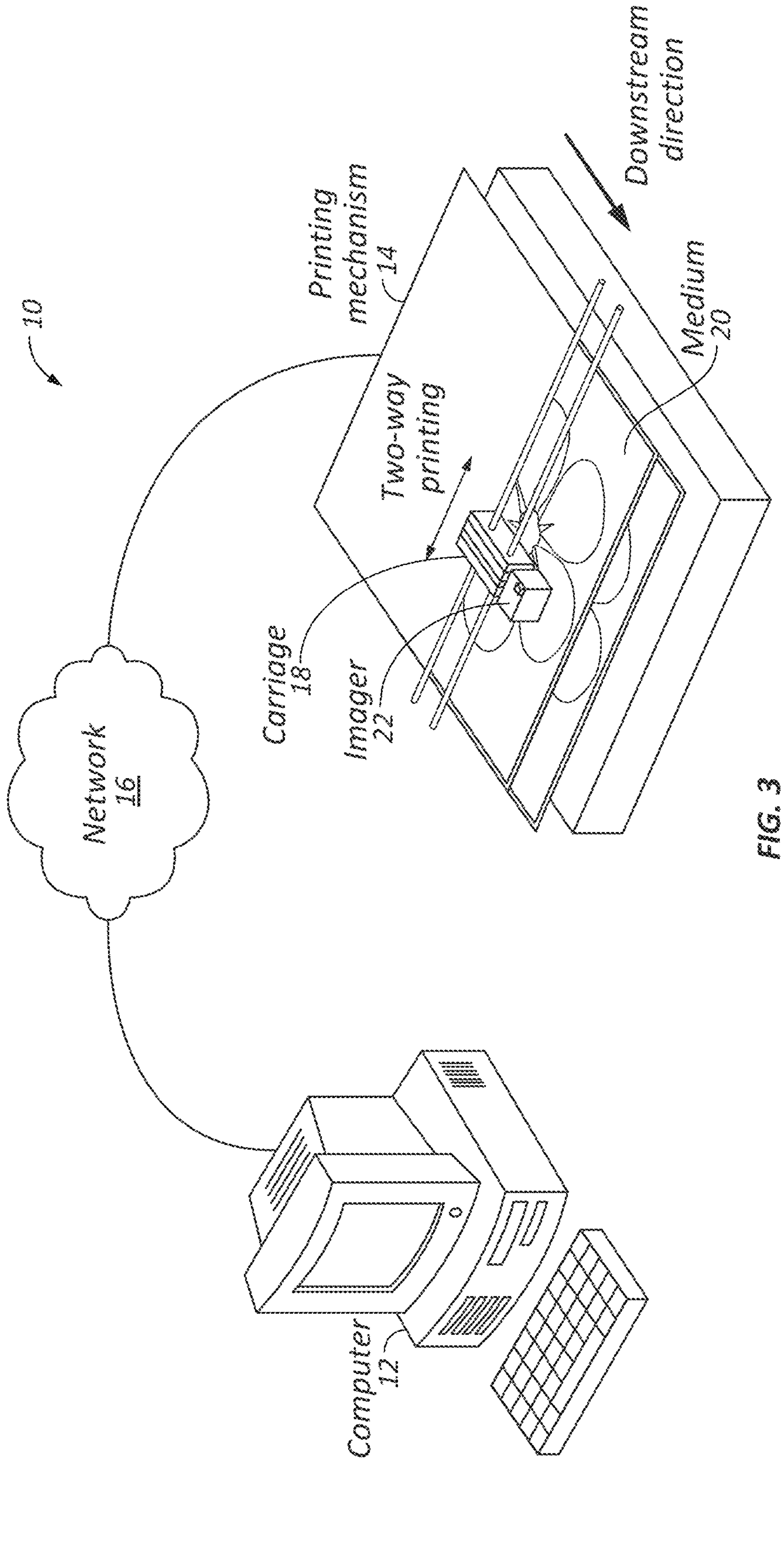
FIG. 3 illustrates a printing system according to some embodiments of the present disclosure.

FIG. 3 illustrates a printing system 10 according to some embodiments of the present disclosure. The printing system 10 includes a computer 12 connected to a printing mechanism 14 over a network 16. The network 16 may include a combination of private, public, wired, or wireless portions. Data communicated over the network 16 may be encrypted or unencrypted at various locations or portions of the network 16. The computer 12, the printing mechanism 14, and any other component of the printing system 10 may include combinations of hardware and/or software to process data, perform functions, communicate over the network 16, and the like.

Any component of the printing system 10 may include a processor, memory or storage, a network transceiver, a display, an operating system and application software (e.g., for providing a user interface), and the like. Other components, hardware, and/or software included in the printing system 10 that are well known to persons skilled in the art are not shown or discussed herein.

The computer 12 may include any computing devices such as a server, desktop or laptop computer (e.g., Apple MacBook, Lenovo 440), handheld mobile device (e.g., Apple iPhone, Samsung Galaxy, Microsoft Surface), and any other electronic computing device, or combinations thereof. In some embodiments, a user can use the computer 12 to send print jobs to the printing mechanism 14 over the network 16.

A print job refers to a file or set of files, including one or more images to be printed by the printing mechanism 14. Different print jobs can be distinguished by a unique identifier and are assigned to a particular destination, usually a printer (e.g., printing mechanism 14). A print job may include instructions that control how a printer should print images. For example, a print job can include instructions regarding options such as medium type, number of copies, quality mode, step size, and priority.

A "printing mechanism" refers to any device or component that can at least contribute to making persistent human-readable representations of images (e.g., graphics or text) on paper, tile, or any other physical mediums (hereinafter "mediums"). As indicated above, an "image" is any visually perceptible object that can be recorded on a medium, which is a physical substrate that can permanently or temporarily record the image. Moreover, where context permits, an image may refer to a portion of another image. The printing mechanism 14 is shown as a shuttle-based inkjet printing mechanism that prints an image on a medium 20 by using a movable carriage that propels droplets of ink onto the medium 20. Although the printing mechanism 14 is described functionally as an inkjet mechanism to aid in understanding, the disclosed concepts are not limited to this particular embodiment. Instead, the printing mechanism 14 can be included in any type of printer that includes or utilizes a shuttle-based system to inspect printed images.

A carriage 18 of the printing mechanism 14 moves perpendicular to the downstream direction of a printing area. The carriage 18 includes various components used to print images onto a medium 20. For example, the carriage 18 includes one or more printheads. A printhead can access a reservoir of color ink or black ink and dispense the ink onto the medium 20, which advances in the downstream direction. Printing involves the carriage 18 passing multiple times back and forth over the medium 20. With each pass, colors of ink are dispensed onto the medium 20 to collectively print an image.

The printing mechanism 14 includes an imager 22 that can be located anywhere downstream of the carriage 18. The imager 22 can capture scanned images of an image being printed on the medium 20. The captured images may be stored locally at a printer, transmitted to another location, such as the computer 12, or both. The imager 22 is a remote sensing device because it captures samples of a printed image without physical contact. An example of the imager 22 includes a scanner including a scanning head that performs a scanning operation on a section of a printed image. Hence, the imager 22 can include hardware and optical and software components that are known to persons skilled in the art and, as such, are not discussed herein.

The printing system 10 can use the disclosed shuttle-based technologies to inspect printed images. For example, the printing mechanism 14 can print a section of an image on the medium 20. The section can correspond to at least a step size taken by the printing mechanism 14 to advance the medium 20 in a downstream direction. The imager 22 can capture sample images of at least the printed sections as the imager 22 passes back and forth over the printed sections in a direction perpendicular to the downstream direction. Computer software at a printer, including the printing mechanism 14, or at another device such as the computer 12, can generate a composite of the samples by stitching together any number of the samples. Any sample or combination of stitched samples can be inspected independently or collectively to determine the values of parameters indicative of printing conditions (e.g., condition of a printer).

Figure 4:
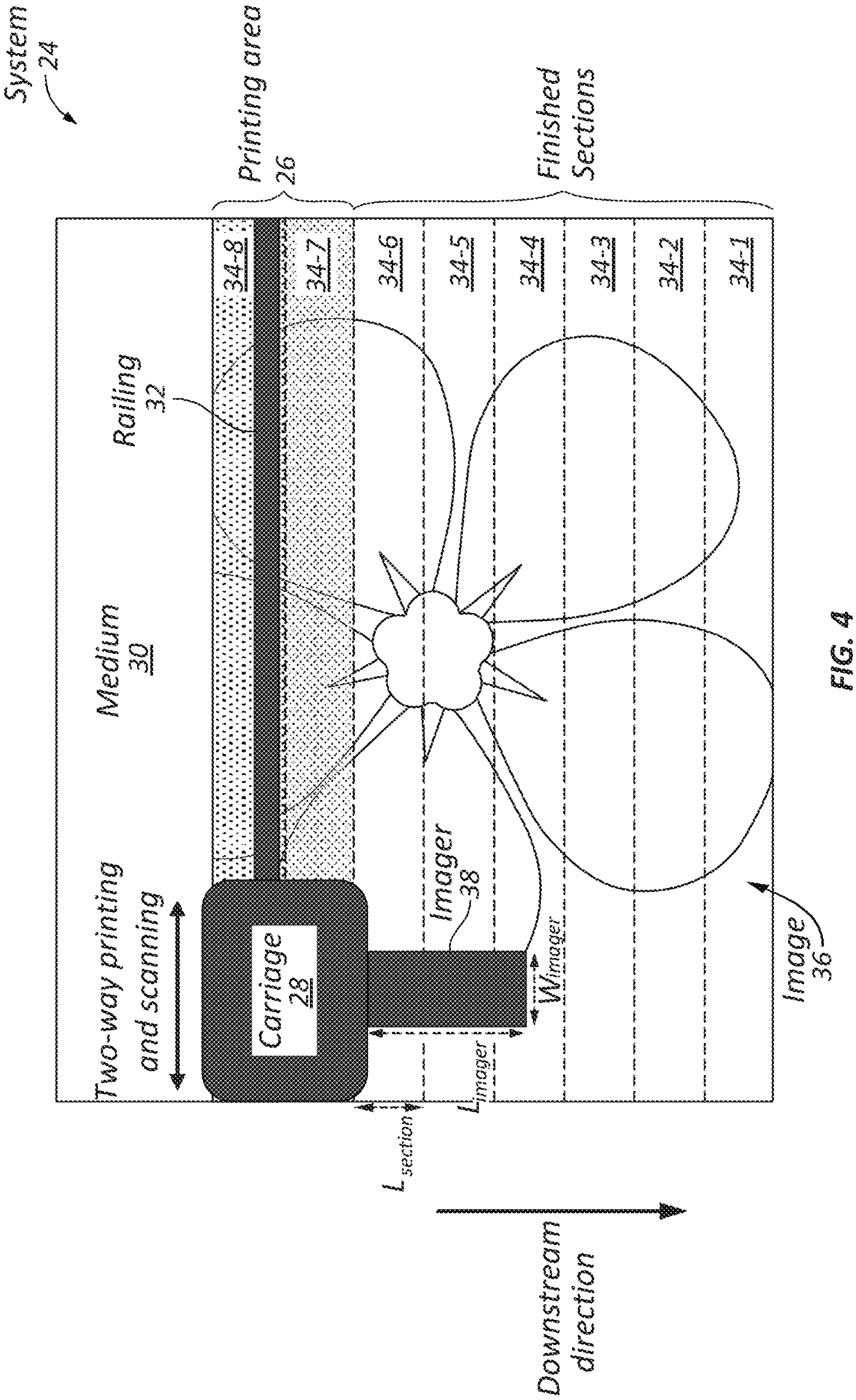
FIG. 4 illustrates an imager structurally coupled to a printer carriage in a shuttle-based system according to some embodiments of the present disclosure.

FIG. 4 illustrates an imager structurally coupled to a printer carriage in a shuttle-based system according to some embodiments of the present disclosure. The system 24 includes a printing area 26 defined as the area over which a carriage 28 can print on the medium 30. The carriage 28 is coupled to the railing 32 to print on the medium 30 as the carriage 28 moves in two directions. The printing area 26 can receive sections 34 (referred to collectively as sections 34 and individually as sections 34-1 through 34-8) of the medium 30 on which respective portions of the image 36 are to be printed. Each of the sections 34 can be defined by a step size taken to advance the medium 30 in a downstream direction.

In some embodiments, the step size can be fixed or varied. For example, a two-pass print mode may not advance a medium on a first print pass, but advance the medium the entire height of a printhead on the second print pass. Moreover, in some embodiments, the sections 34 can be slightly larger than the step size to facilitate subsequent stitching of the sample images to form the image 36, as detailed further below.

The carriage 28 is operable to dispense ink onto sections of the medium 30 within the printing area 26. In particular, the carriage 28 can move on the railing 32 in a direction perpendicular to the downstream direction, passing back and forth multiple times over the printing area 26, each time dispensing ink onto the sections of the medium 30 within the printing area 26. The carriage 28 passes over the printing area 26 a sufficient number of times to complete the printing of a portion of the image 36 in the printing area 26.

In the embodiment of FIG. 4, the medium 30 has eight sections 34-1 through 34-8 that have had at least one pass by the carriage 28. For example, sections 34-1 through 34-7 could be finished sections, whereas section 34-8 could be an unfinished section. More specifically, section 34-8 could have had one pass completed by the carriage 28, and section 34-7 could have had two passes completed by the carriage 28.

After the carriage 28 has finished printing the portion of the image 36 onto the section 34-7, the medium 30 takes a step to advance downstream. As such, the finished section 34-7 exits the printing area 26, the section 34-8 advances to occupy a portion of the printing area 26 previously occupied by the section 34-7, and a new section enters the printing area 26. Then the carriage 28 passes over the printing area back and forth as needed. This process repeats iteratively to print the image 36 on the medium 30 section by section, until the entire image 36 has been printed on the medium 30.

The components of the system 24 include an imager 38 that is located downstream of the carriage 28 but structurally coupled to the carriage 28. As such, the imager 38 and the carriage 28 can move simultaneously back and forth over sections 34 of the medium 30 in a direction perpendicular to the downstream direction. The imager 38 can capture one or more images of at least one finished section (e.g., section 34-5). Each captured image is a sub-image (hereinafter a "sample image") that can span a printed section 34 of the image 36. An array of sample images collectively spans the image 36 in its entirety.

For example, the imager 38 can capture sample images of printed sections as the imager 38 passes over the printed sections while the carriage 28 simultaneously prints other sections. In some embodiments, the resolution of the imager 38 may be equal to or greater than the maximum dots per inch (dpi) value of the printed image (e.g., 1,000 dpi).

In some embodiments, the imager 38 has a field of view defined by a length ($L_{imager}$) and a width ($W_{imager}$). The length ($L_{imager}$) is equal to or greater than the length ($L_{section}$) of the largest section of sections 34. As such, any step size taken by the printing mechanism to advance the medium 30 downstream is equal to or less than the length ($L_{imager}$) of the imager. For example, in some embodiments, the length ($L_{imager}$) of the imager 38 may be greater than or equal to a largest step size of the printer.

The disclosed system includes an image processing subsystem (not shown in FIG. 4) that can inspect at least one of the sampled images captured by the imager 38 to determine values of parameters indicative of printing conditions (e.g., condition of a printer). Referring back to FIG. 3, the image processing subsystem may be resident at the printer, including the printing mechanism 14, or at the computer 12. Accordingly, the sampled images captured by the imager 38 could be communicated over the network 16 from the printing mechanism 14 to the computer 12, where the sample images are processed to make a determination about the printing performed by a printer that includes the printing mechanism 14.

Figure 5:
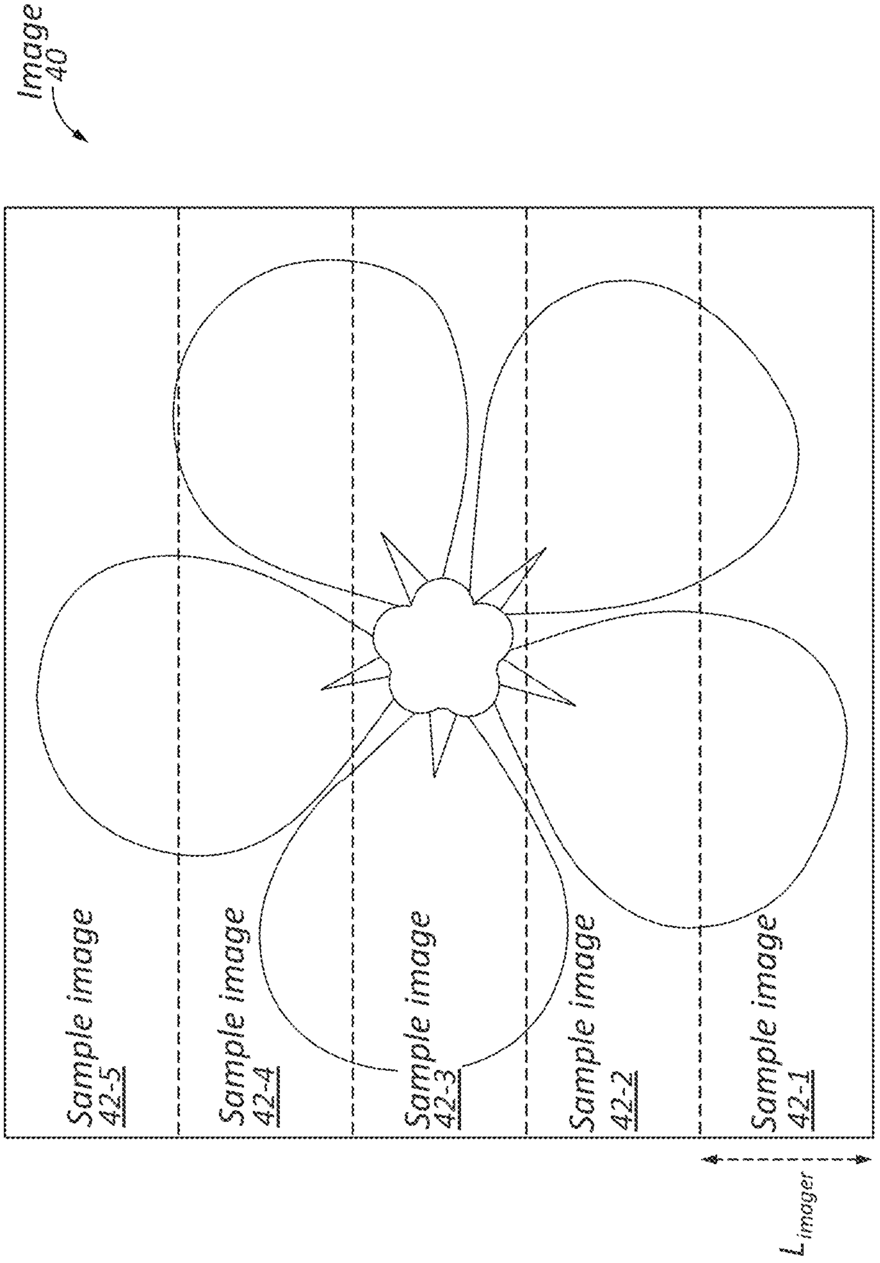
FIG. 5 shows a stitched image representative of a printed image captured by an imager as the composition of numerous sample images according to some embodiments of the present disclosure.

In some embodiments, the image processing subsystem can stitch together any number of the sample images captured by the imager 38. For example, FIG. 5 shows an image 40 representative of the image 36 stitched together from numerous sample images 42 captured by the imager 38.

As used herein, stitching is a process that involves combining multiple sample images with overlapping fields of view to produce a segmented image. Stitching is commonly performed through the use of computer software and can require nearly exact overlaps between images at identical exposures to produce seamless results. The process of stitching can include determining an appropriate model that relates pixel coordinates in one sample image to pixel coordinates in another in order to align stitching of two sample images. The process may involve estimating the correct alignments relating to various pairs (or collections) of sample images. In some embodiments, distinctive features can be found in each sample image and then matched to establish correspondences between pairs of sample images.

The determination of values indicative of printing conditions can be based on any number of sample images 42, including an array of sample images 42 that have been stitched together to form a portion or an entire representation of the image 40. For example, the image processing subsystem may make a determination about print quality based on an inspection of a single sample image 42-1, or based on a stitched portion (e.g., any of 42-1 through 42-5), or the entire stitched image 40 (e.g., all of 42-1 through 42-5).

The inspection can be performed to make a variety of determinations about the performance of a printer, including the status of any consumable items such as ink, as well as the status of mechanical components such as the alignment of printheads. As such, the determination made about a printer could be used to identify maintenance needs, identify errors, and to troubleshoot. For example, the disclosed technology could be used for diagnostic assessments by scanning and imaging various printed targets. In particular, nozzle-out or misdirected nozzles could be detected, alignment errors could be measured from an appropriately designed target, and color adjustments could be facilitated.

Figure 6:
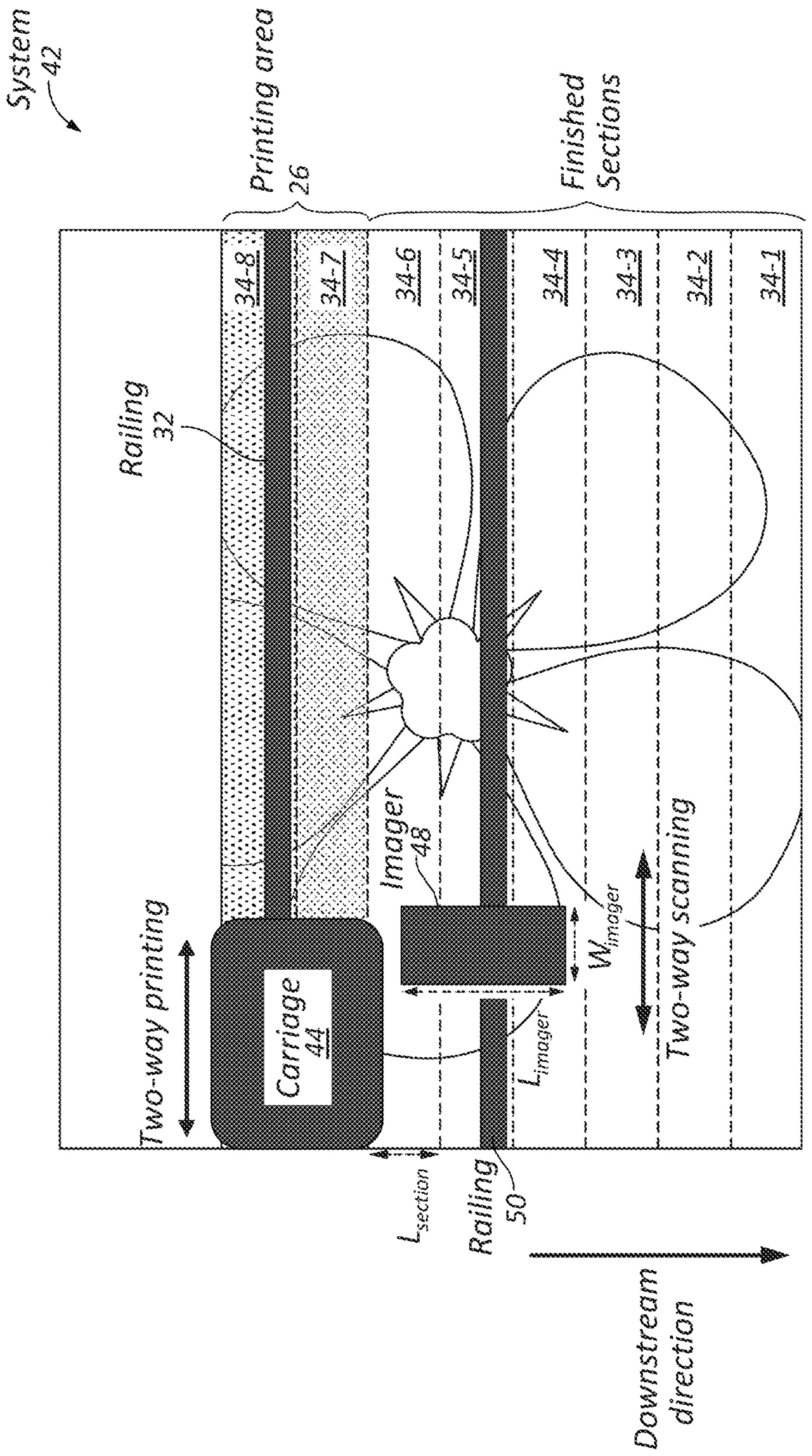
FIG. 6 illustrates an imager structurally decoupled from a printer carriage in a shuttle-based system according to some embodiments of the present disclosure.

FIG. 6 illustrates an imager structurally decoupled from a printer carriage in a shuttle-based system according to some embodiments of the present disclosure. The system 42 is similar to the system 24 of FIG. 4 except that an imager 48 can move independently of a carriage 44. In particular, the carriage 44 and imager 48 are movable along separate railings. The carriage 44 is movable along a railing 32 in a direction perpendicular to the downstream direction, passing back and forth multiple times to print portions of the image 36 onto the medium 30. The imager 48 is movable along a railing 50 in a direction perpendicular to the downstream direction, capable of passing back and forth any number of times to scan an image printed on the medium 30.

In some embodiments, the scanning axis of the imager 48 is not parallel to the axis of movement of the carriage 44. As such, the scanning axis of the imager 48 may not be perpendicular to the downstream direction. Instead, the imager 48 could be mounted on a railing 50 that is at an angle from the rail of the carriage 44. This would still allow the imager 48 to capture the entire image 40 by way of sub-images.

Similar to the system 24 shown in FIG. 4, the imager 48 is downstream of the carriage 44. In some embodiments, the imager 48 has a field of view defined by a length ($L_{imager}$) and width ($W_{imager}$). The length ($L_{imager}$) is equal to or greater than the length ($L_{section}$) of the largest section of sections 34. As such, any step size taken by the printing mechanism to advance the medium 30 downstream is equal to or less than the length ($L_{imager}$) of the imager. Hence, the imager 48 can capture sample images of the printed image 36 corresponding to respective sections 34 of the medium 30.

Dissimilar from the system 24 shown in FIG. 4, any of a direction, speed, and acceleration of the imager 48 may be the same as or different from the carriage 44. For example, a scan rate and acceleration of the imager 48 may equal the maximum speed and acceleration of the carriage 44. Specifically, the scan rate of the imager 48 may equal the maximum speed of the carriage 44 (e.g., 73 inches per second (ips)). The acceleration of the imager 48 may equal the maximum acceleration of the carriage 44 (e.g., 1 g of gravitational force). The ability to independently control movement of the imager 48 from the carriage 44 provides flexibility for tuning inspection of a printed image to determine various printing conditions.

In some embodiments, the imagers 38 or 48 can be located upstream from the carriages 28 or 44, respectively, to capture sample images of incoming media before printed images are printed on that media. As such, the systems 24 or 42 can reject any defective media using similar technology described above to avoid printing on defective media. Hence, imagers can capture sample images of media upon which printed images are scheduled to print and reject defective media to prevent defective printed images.

Figure 7:
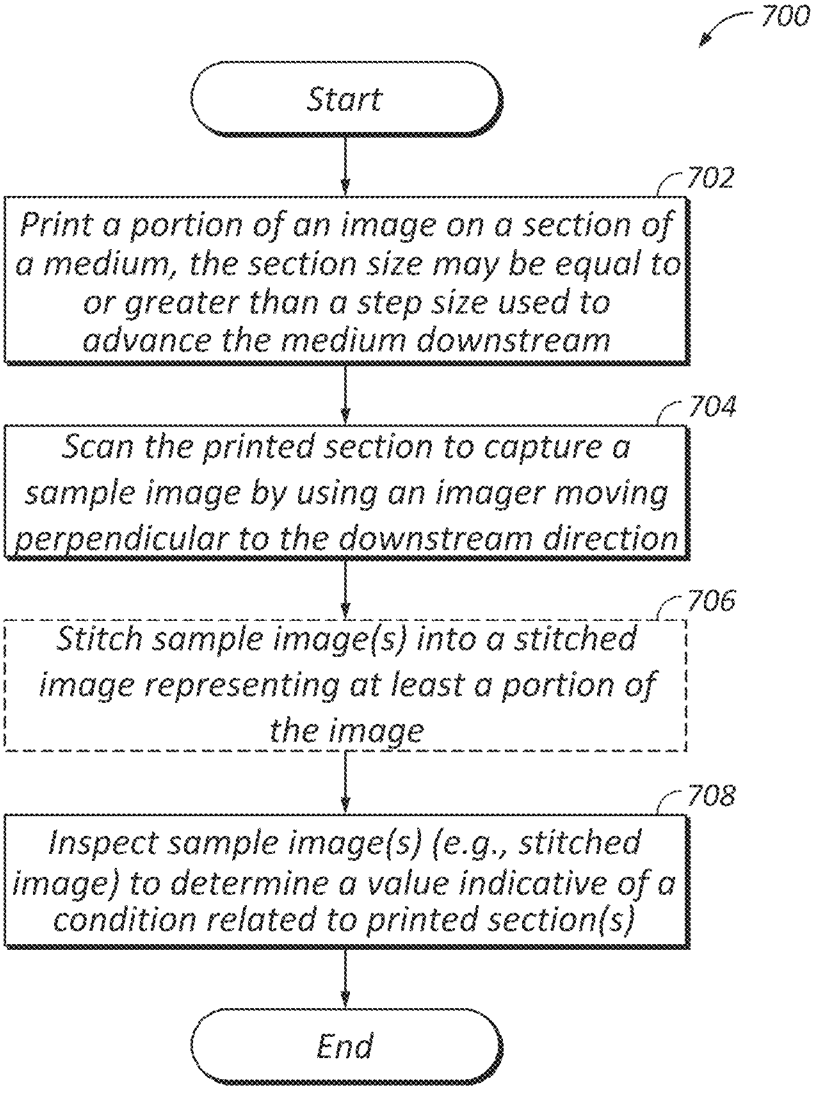
FIG. 7 is a flowchart illustrating a process performed by a shuttle-based system according to some embodiments of the present disclosure.

FIG. 7 is a flowchart illustrating a process 700 performed by a system for inspecting an image printed by a shuttle-based printer according to some embodiments of the present disclosure. In step 702, a portion of an image is printed by passing a carriage of the shuttle-based printer multiple times over a section of a medium. The section of the medium typically has a size defined by a step size taken by the shuttle-based printer to advance the medium in a downstream direction. In some embodiments, the section size may be greater than the step size to facilitate subsequently stitching multiple sections together.

In step 704, an imager downstream of the carriage can capture a sample image of the printed section. The sample image is captured by passing the imager in a direction perpendicular to the downstream direction. As described above, the imager can be structurally decoupled or coupled to the carrier that prints the image. As such, the imager and the printer carriage will move simultaneously or independently, respectively. Either way, a maximum step size taken by the shuttle-based printer is typically equal to or less than a length of a field of view of the imager in the downstream direction.

In step 706, multiple sample images can be optionally stitched together into a stitched image representing at least a portion of the image printed on the medium. The stitched image can be based on a combination of any number of the sampled images. For example, the stitched image can represent a portion of the image or the image in its entirety.

In step 708, the system can inspect at least a portion of the sample image to determine a value indicative of a printing condition. For example, the system can inspect a single sample image or the stitched image to determine a condition of the shuttle-based printer. As indicated above, the inspecting can be performed at the shuttle-based printer or another device such as a remotely located computer.

Figure 8:
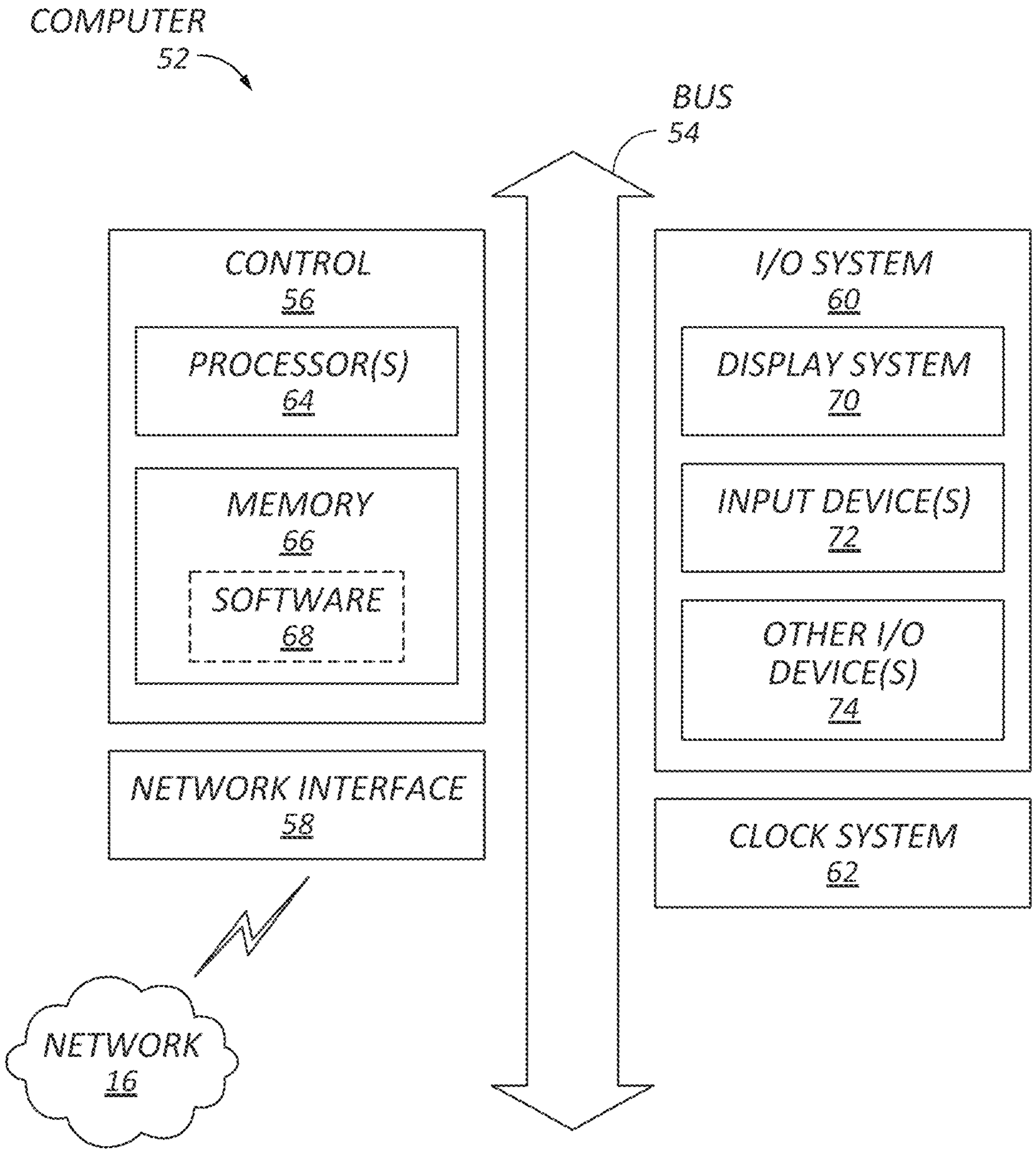
FIG. 8 is a block diagram of a computer operable to implement the disclosed technology according to some embodiments of the present disclosure.

FIG. 8 is a block diagram of a computer 52 of printing system 10 operable to implement the disclosed technology according to some embodiments of the present disclosure. The computer 52 may be a generic computer or one specifically designed to carry out features of printing system 10. For example, the computer 52 may be a system-on-chip (SOC), a single-board computer (SBC) system, a desktop or laptop computer, a kiosk, a mainframe, a mesh of computer systems, a handheld mobile device, part of cloud-based data collection systems, included in internet-of-things devices, part of Industry 4.0 systems, or combinations thereof.

The computer 52 may be a standalone device or part of a distributed system that spans multiple networks, locations, machines, or combinations thereof. In some embodiments, the computer 52 operates as a server computer (e.g., computer 12) or a client device (e.g., printing mechanism 14) in a client-server network environment, or as a peer machine in a peer-to-peer system. In some embodiments, the computer 52 may perform one or more steps of the disclosed embodiments in real time, near real time, offline, by batch processing, or combinations thereof.

As shown in FIG. 8, the computer 52 includes a bus 54 that is operable to transfer data between hardware components. These components include a control 56 (e.g., processing system), a network interface 58, an input/output (I/O) system 60, and a clock system 62. The computer 52 may include other components that are not shown nor further discussed for the sake of brevity. One having ordinary skill in the art will understand any hardware and software that is included but not shown in FIG. 8.

The control 56 includes one or more processors 64 (e.g., central processing units (CPUs), application-specific integrated circuits (ASICs), and/or field programmable gate arrays (FPGAs)) and memory 66 (which may include software 68). For example, the memory 66 may include volatile memory, such as random-access memory (RAM), and/or non-volatile memory, such as read-only memory (ROM). The memory 66 can be local, remote, or distributed.

A software program (e.g., software 68), when referred to as "implemented in a computer-readable storage medium," includes computer-readable instructions stored in the memory (e.g., memory 66). A processor (e.g., processor 64) is "configured to execute a software program" when at least one value associated with the software program is stored in a register that is readable by the processor. In some embodiments, routines executed to implement the disclosed embodiments may be implemented as part of operating system (OS) software (e.g., Microsoft Windows® and Linux®) or a specific software application, component, program, object, module, or sequence of instructions referred to as "computer programs."

As such, the computer programs typically comprise one or more instructions set at various times in various memory devices of a computer (e.g., computer 52), which, when read and executed by at least one processor (e.g., processor 64), will cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., the memory 66).

The network interface 58 may include a modem or other interfaces (not shown) for coupling the computer 52 to other computers over the network 16. The I/O system 60 may operate to control various I/O devices including peripheral devices, such as a display system 70 (e.g., a monitor or touch-sensitive display) and one or more input devices 72 (e.g., a keyboard and/or pointing device). Other I/O devices 74 may include, for example, a disk drive, printer, scanner, or the like. Lastly, the clock system 62 controls a timer for use by the disclosed embodiments.

Operation of a memory device (e.g., memory 66), such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

We claim:

1. A system operable to determine a condition relative to an image being printed on a medium, the system comprising:

a printer carriage operable to move in a first direction along a first axis to print the image as a plurality of sections, wherein each section is printed one after another on the medium in a second direction along a second axis different from the first axis;

an imager located downstream of the printer carriage and operable to move in a third direction along a third axis to capture a sample image of each printed section of the plurality of sections of the image printed on the medium, wherein the imager is operable to move independent of the printer carriage, wherein the third axis is not parallel to the first axis, and wherein the sample image of a printed section of the plurality of printed sections of the image is captured by the imager after the printer carriage completes printing the section of the image on the medium, and after the medium advances; and an inspection mechanism operable to stitch each sample image of each printed section of the plurality of printed sections of the image into a stitched image and determine a condition relative to the image based on the stitched image.

2. The system of claim 1, wherein the sample image corresponds to an entire image.

3. The system of claim 1, wherein the sample image is only a portion of the image.

4. The system of claim 1, wherein the inspection mechanism is a component of the system.

5. The system of claim 1, wherein the inspection mechanism is a component of a device other than the system.

6. The system of claim 1, wherein the plurality of sections is defined by a step size.

7. The system of claim 6, wherein the step size is equal to or less than a field of view of the imager.

8. A method comprising:

printing, by a printhead of a printer on a first section of a medium, wherein the printhead is operable to move in a first direction along a first axis;

scanning, by an imager, the medium to capture a sample image of a first image printed on the first section, wherein the imager is operable to move in a second direction along a second axis to the printhead and move independent of the printhead, wherein the second direction is different from the first direction, wherein the second axis is not parallel to the first axis, and wherein the sample image is captured after the printer completes printing the first image on the first section, after the medium advances; and inspecting the sample image of the first image printed on the first section to determine a condition of the printer.

9. The method of claim 8, wherein the medium has a plurality of sections, and wherein the sample image reflects an entire image printed on the plurality of sections.

10. The method of claim 8, wherein the printhead moves in the first direction and the medium advances while printing in a second direction different from the first direction.

11. The method of claim 8, wherein the inspecting is performed by the printer.

12. The method of claim 8, wherein the inspecting is performed by a computer remotely coupled to the printer.

13. The method of claim 8, the medium having a plurality of sections that are each defined by a step size.

14. The method of claim 13, wherein the step size is less than a field of view of a scanner that performs the scanning.

15. The method of claim 13, wherein the step size is equal to a field of view of a scanner that performs the scanning.

16. A printer comprising:

a printer carriage advancing in a first direction and along a first axis when printing an image on a medium; and an imager located downstream of the printer carriage and configured to capture a sample image of a printed portion, wherein the sample image is captured as the printer carriage moves in a second direction, different from the first direction, and along a second axis different from the first axis, wherein the imager is operable to move in the first direction and move independent of the printer carriage, and wherein the sample image is captured after the printer carriage completes printing a portion of the image.

17. The printer of claim 16, wherein the sample image reflects an entire image printed on a plurality of sections of the medium.

18. The printer of claim 16, wherein the sample image is only a portion of the image.

19. The printer of claim 16, wherein a step size taken by the printer to advance the medium when printing the image is less than a field of view of the imager.

20. The printer of claim 16, wherein a step size taken by the printer to advance the medium when printing the image is equal to a field of view of the imager.

* * * * *